United States Patent
Unno et al.

(10) Patent No.: US 9,020,284 B2
(45) Date of Patent: Apr. 28, 2015

(54) IMAGE ENCODING APPARATUS

(71) Applicant: Hitachi Information & Telecommunication Engineering, Ltd., Kanagawa (JP)

(72) Inventors: Kyohei Unno, Tokyo (JP); Hironori Komi, Tokyo (JP); Yusuke Yatabe, Tokyo (JP); Mitsuhiro Okada, Tokyo (JP); Hiroshi Kojima, Tokyo (JP); Yoshimasa Kashihara, Yokohama (JP); Toshikazu Yanagihara, Yokohama (JP)

(73) Assignee: Hitachi Information & Telecommunication Engineering, Ltd., Kanagawa (JP)

( * ) Notice: Subject to any disclaimer, the term of this patent is extended or adjusted under 35 U.S.C. 154(b) by 0 days.

(21) Appl. No.: 14/155,435

(22) Filed: Jan. 15, 2014

(65) Prior Publication Data

US 2014/0205198 A1    Jul. 24, 2014

(30) Foreign Application Priority Data

Jan. 24, 2013    (JP) .................................. 2013-010807

(51) Int. Cl.
| | |
|---|---|
| G06K 9/36 | (2006.01) |
| G06T 9/00 | (2006.01) |
| H04N 19/172 | (2014.01) |
| H04N 19/127 | (2014.01) |
| H04N 19/91 | (2014.01) |
| H04N 19/156 | (2014.01) |
| H04N 19/436 | (2014.01) |
| H04N 19/154 | (2014.01) |

(52) U.S. Cl.
CPC ................ *G06T 9/00* (2013.01); *H04N 19/172* (2014.01); *H04N 19/127* (2014.11); *H04N 19/91* (2014.01); *H04N 19/154* (2014.01); *H04N 19/156* (2014.01); *H04N 19/436* (2014.01)

(58) Field of Classification Search
USPC .............................. 382/232, 239; 341/65, 67; 348/E17.003; 375/240.12, 240.25, 375/240.02, E7.243; 703/1; 704/277
See application file for complete search history.

(56) References Cited

U.S. PATENT DOCUMENTS

| | | | |
|---|---|---|---|
| 6,172,621 B1 | 1/2001 | Iwata | |
| 7,929,776 B2 * | 4/2011 | Sethi et al. | 382/232 |
| 8,660,177 B2 * | 2/2014 | Huang et al. | 375/240.02 |
| 8,711,946 B2 * | 4/2014 | Jang et al. | 375/240.25 |

FOREIGN PATENT DOCUMENTS

| | | |
|---|---|---|
| JP | 9-238334 A | 9/1997 |
| JP | 11-346366 A | 12/1999 |

* cited by examiner

*Primary Examiner* — Anh Do
(74) *Attorney, Agent, or Firm* — Baker Botts L.L.P.

(57) ABSTRACT

An image encoding apparatus is provided which realizes an encoding process at a high bit rate without degradation in image quality at boundary parts within a picture. The image encoding apparatus 1 includes: a plurality of entropy encoding sections 105 and 106 for generating bit streams by entropy-encoding intermediate data generated from syntax elements of image data; and an encoding control section 104 for supplying the intermediate data to any of the entropy encoding sections. The encoding control section 104 determines the entropy encoding section that performs an entropy encoding process by a frame in accordance with the processing status of each of the entropy encoding sections.

7 Claims, 9 Drawing Sheets

IMAGE ENCODING APPARATUS

CLAIM OF PRIORITY

The present application claims priority from Japanese patent application serial No. JP2013-010807, filed on Jan. 24, 2013, the content of which is hereby incorporated by reference into this application.

BACKGROUND OF THE INVENTION

1. Field of the Invention

The present invention relates to an image encoding apparatus that efficiently encodes image data while suppressing degradation in image quality.

2. Description of the Related Art

In order to deal with an increase in speed of image encoding process, a constitutions has been proposed in which a plurality of encoding devices are operated in parallel with each other. Japanese Patent Laid-Open No. H09-238334 discloses a constitution in which an input video signal is divided into a plurality of blocks per picture, and N (N is a natural number of two or more) encoding devices simultaneously encode and output video signals at same pixel positions in each block separately from each other. Japanese Patent Laid-Open No. H11-346366 discloses a constitution in which encoding object data is divided into a plurality of pieces of partial data, the divided partial data are allocated to a plurality of encoding means, and next partial data is further allocated sequentially to encoding means that have completed the encoding of the allocated partial data.

SUMMARY OF THE INVENTION

In the above-described Japanese Patent Laid-Open No. H09-238334, one picture is divided into a plurality of blocks to generate N video signals of the same pixel positions in each block, each of which is encoded by the N encoding devices. This will result in a high correlation between the encoded image data and make image distortion at a time of decoding less conspicuous. However, degradation in image quality at boundary parts within a picture, accompanied by a picture division, is inevitable.

In the above-described Japanese Patent Laid-Open No. H11-346366, video segments formed by shuffling M (M=5, for example) macroblocks within one frame are used as processing units (partial data) to be subjected to parallel encoding process. At times of a use of the video segments, parallel processing will be advantageous because there occurs no data-dependent relation between the video segments. However, also in this case, degradation in image quality at boundary parts within a picture, accompanied by the picture division, is inevitable.

It is an object of the present invention, in view of this problem, to provide an image encoding apparatus that realizes an encoding process at a high bit rate without degradation in image quality at boundary parts within a picture.

In order to solve the above problem, according to the present invention, there is provided an image encoding apparatus including: a syntax element generating section for generating syntax elements from image data; an intermediate data generating section for generating intermediate data from the syntax elements; a plurality of entropy encoding sections for generating bit streams by entropy-encoding the intermediate data; a multiplexing section for multiplexing a plurality of the encoded bit streams into one bit stream; and an encoding control section for writing the intermediate data output from the intermediate data generating section to a memory, reading the intermediate data from the memory, and supplying the intermediate data to any of the entropy encoding sections. The encoding control section determines an entropy encoding section that performs an entropy encoding process by a frame in accordance with processing status of each of the entropy encoding sections, reads the intermediate data of a corresponding frame from the memory, and supplies the intermediate data of the corresponding frame to the determined entropy encoding section. The determined entropy encoding section entropy-encodes all the intermediate data of the corresponding frame, and the other entropy encoding sections do not entropy-encode the intermediate data of the frame concerned.

According to the present invention, there is provided an image encoding apparatus including: a syntax element generating section for generating syntax elements from image data; a plurality of encoding sections for generating bit streams by encoding the syntax elements; a multiplexing section for multiplexing a plurality of the encoded bit streams into one bit stream; and an encoding control section for writing the syntax elements output from the syntax element generating section to a memory, reading the syntax elements from the memory, and supplying the syntax elements to any of the encoding sections. The encoding control section determines an encoding section that performs an encoding process by a frame in accordance with processing status of each of the encoding sections, reads the syntax elements of a corresponding frame from the memory, and supplies the syntax elements of the corresponding frame to the determined encoding section. The determined encoding section encodes all the syntax elements of the corresponding frame, and the other encoding section does not encode the syntax elements of the frame concerned.

According to the present invention, it is possible to provide an image encoding apparatus that realizes an encoding process at a high bit rate without degradation in image quality at boundary parts within a picture.

DETAILED DESCRIPTION OF THE EMBODIMENT

In the following embodiments, an example will be shown in which an image of a Full HD size (1920×1080 pixels) at 30 fps is encoded at a bit rate of 80 Mbps according to a CABAC (Context-based Adaptive Binary Arithmetic Coding) system of ITU-T Rec. H.264|ISO/IEC 14496-10 Advanced Video Coding (hereinafter referred to as H.264). In addition, three kinds of frames, which are I-frames, P-frames, and B-frames, are all used for a picture configuration at encoding process.

First Embodiment

Figure 1:
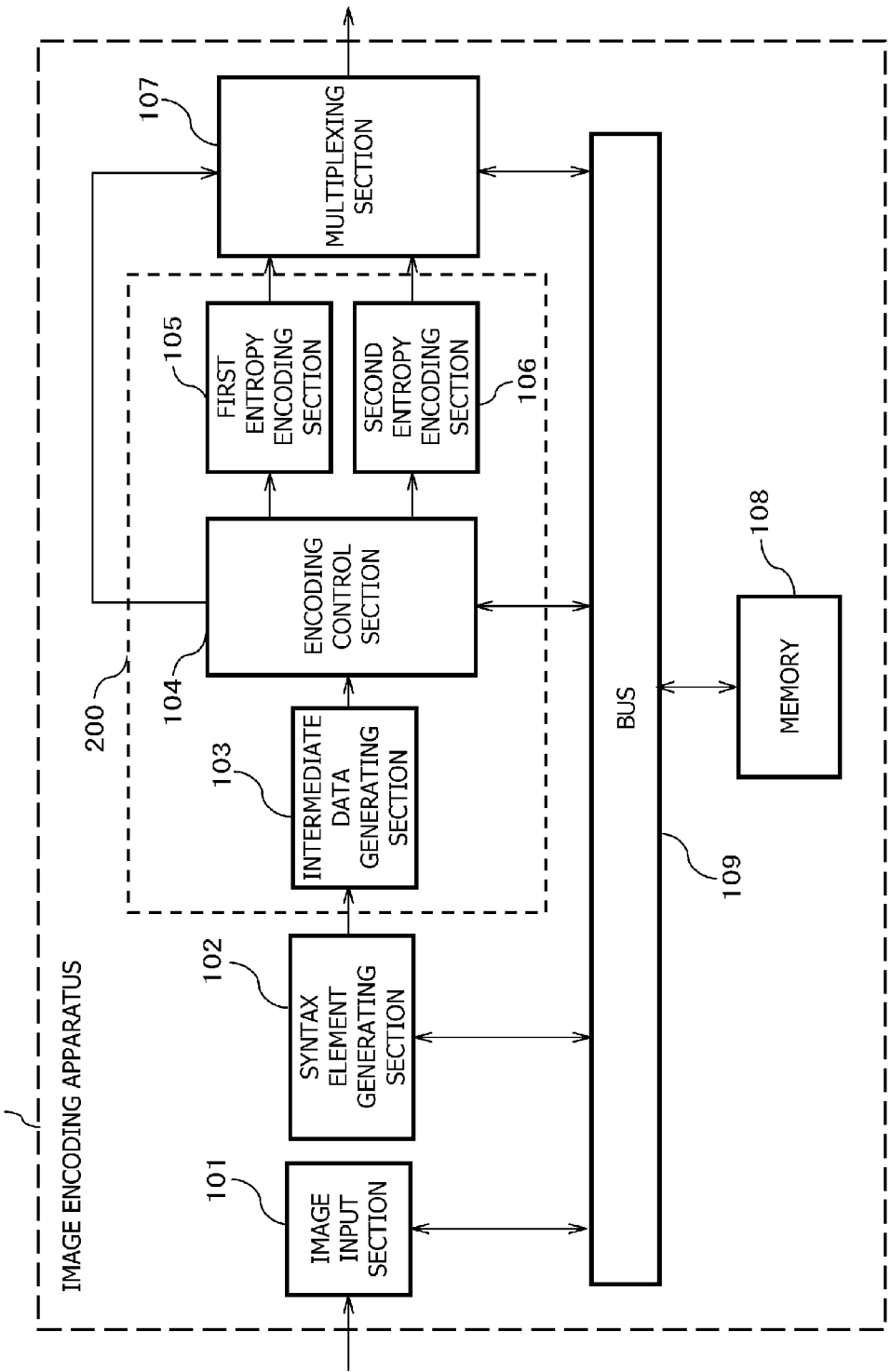
FIG. 1 is a diagram showing a configuration of an image encoding apparatus according to a first embodiment.

FIG. 1 is a diagram showing a configuration of an image encoding apparatus according to a first embodiment. The image encoding apparatus 1 includes an image input section 101, a syntax element generating section 102, an intermediate data generating section 103, an encoding control section 104, a first entropy encoding section 105, a second entropy encoding section 106, a multiplexing section 107, a memory 108, and a bus 109. The image encoding apparatus 1 inputs image data of an encoding object from the image input section 101 and outputs a bit stream after an encoding from the multiplexing section 107. In the present embodiment, the two entropy encoding sections 105 and 106 are provided for parallel encoding process. A broken line 200 represents a constituent part where a CABAC processing is performed. The intermediate data generating section 103, the encoding control section 104, the first entropy encoding section 105, and the second entropy encoding section 106 correspond to the constituent part.

Figure 2:
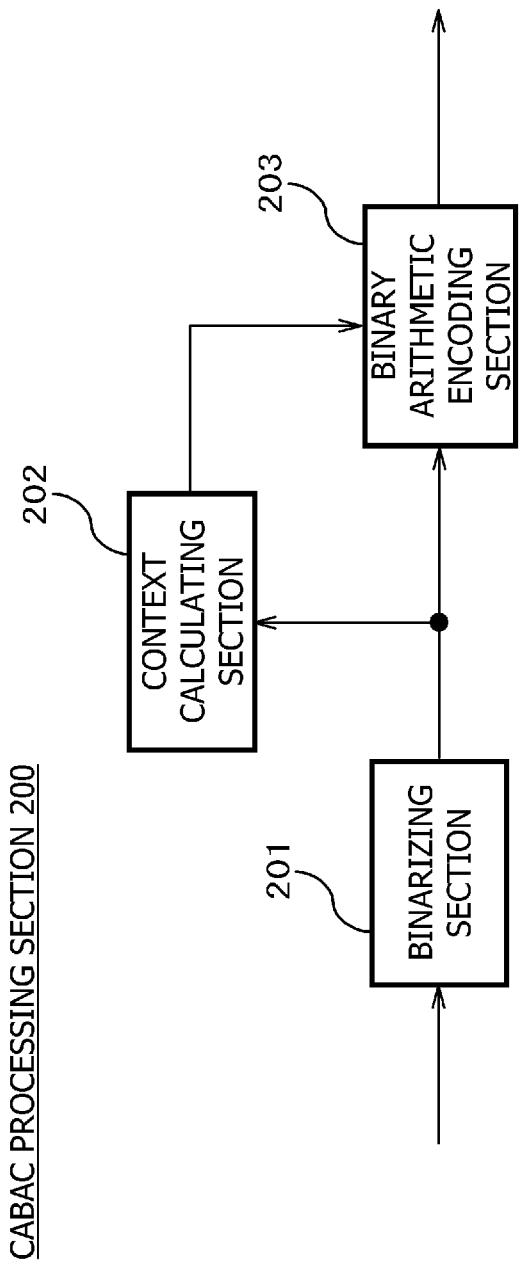
FIG. 2 is a diagram of assistance in explaining CABAC processing.

FIG. 2 is a diagram of assistance in explaining the CABAC (Context Adaptive Binary Arithmetic Coding) processing used in the present embodiment. A CABAC processing section 200 functionally includes a binarizing section 201, a context calculating section 202, and a binary arithmetic encoding section 203.

The binarizing section 201 is supplied with syntax elements defined in H.264 (such as header information, motion vectors, and orthogonal transform coefficients after quantization), subjects the syntax elements to a binarization processing by a method defined in the standard, and outputs the binarized data. The context calculating section 202 updates a probability model each time the binarized data is subjected to 1-bit processing. The binary arithmetic encoding section 203 subjects the binarized data input to the binary arithmetic encoding section 203 to a binary arithmetic encoding bit by bit on the basis of the probability model calculated in the context calculating section 202, and outputs a resulting bit stream. The CABAC processing thus performs the encoding process while updating the probability model each time the binarized data is subjected to the 1-bit processing, and is therefore able to encode the input data so as to compress the input data to a theoretical limit.

A picture configuration of an encoding object image includes I-frames, P-frames, and B-frames. An I-frame is a frame in which a predictive encoding is performed using the correlation of the image in a spatial direction; that is, using a decoded image of a region whose encoding has been already completed within the same frame. The P-frames and B-frames are a frame in which a predictive encoding is performed also using the correlation of the image in a temporal direction; that is, using a decoded image of a temporally past or future frame whose encoding has been already completed. A frame that can simultaneously refer to one frame is referred to as a P-frame. A frame that can simultaneously refer to two frames is referred to as a B-frame. The encoding efficiency of P-frames and B-frames is generally better than that of I-frames. Therefore, when encoding is performed using all of the I-frames, P-frames, and B-frames, an amount of code generated varies depending on the kinds of frames.

Figure 3:
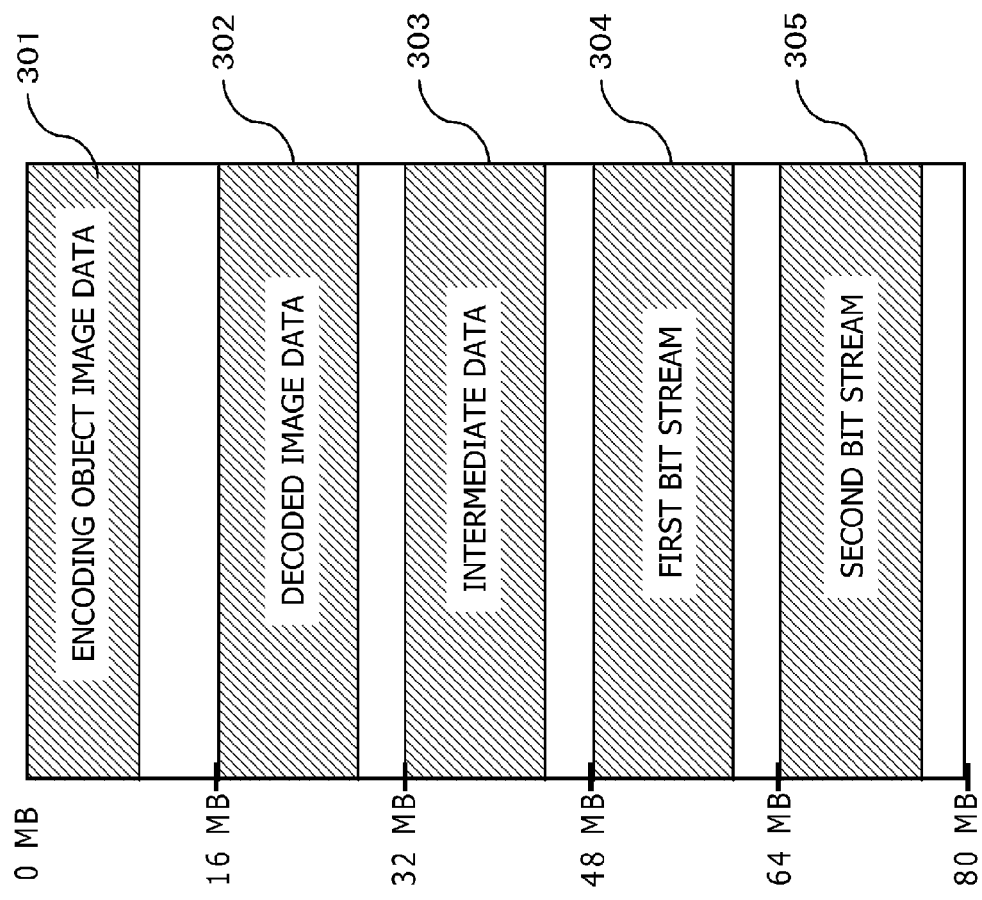
FIG. 3 is a diagram showing the memory mapping of a memory 108.

FIG. 3 is a diagram showing the memory mapping of the memory 108. An SDRAM, for example, is used as the memory 108 which has a plurality of buffers 301 to 305 to store various kinds of data involved in the encoding process.

The operation of each part of the image encoding apparatus 1 will be described in the following with reference to FIGS. 1 to 3.

The image input section 101 inputs encoding object image data and writes the encoding object image data to an encoding object image buffer 301 in the memory 108 via the bus 109.

The syntax element generating section 102 subjects the input image data to processing such as predictive encoding, a discrete cosine transform, and quantization, for each macroblock (hereinafter referred to as MB) of a 16×16 pixel size. Then, the syntax element generating section 102 generates syntax elements defined in H.264, such as header information, motion vectors, and transform coefficients after quantization. At this time, the syntax element generating section 102 uses data of an encoding object image read from the encoding object image buffer 301, and uses data of a decoded image serving as a reference image, the data of the decoded image being read from a decoded image buffer 302. The syntax element generating section 102 further creates a decoded image of the MB concerned on the basis of the generated syntax elements and writes the decoded image of the MB concerned to the decoded image buffer 302. The generated syntax elements are output to the intermediate data generating section 103.

The intermediate data generating section 103 corresponds to the binarizing section 201 in FIG. 2. The intermediate data generating section 103 generates encoding intermediate data (hereinafter referred to simply as intermediate data) by binarizing the syntax elements by a method defined in the CABAC. The generated intermediate data is output to the encoding control section 104.

The encoding control section 104 outputs by a frame the intermediate data output from the intermediate data generating section 103 to either the first entropy encoding section 105 or the second entropy encoding section 106. At the time of the output, the encoding control section 104 temporarily writes the intermediate data to an intermediate data buffer 303 in the memory 108 via the bus 109, determines the entropy encoding section for encoding process of a next frame, then reads the intermediate data of the frame from the buffer 303, and finally outputs the intermediate data of the frame to the determined entropy encoding section. As will be described later, in the present embodiment, the entropy encoding section that has completed the encoding process earlier is assigned as the entropy encoding section for encoding the next frame.

The encoding control section 104 generates multiplexing control information related to frames output to the entropy encoding sections 105 and 106 and notifies the multiplexing control information to the multiplexing section 107. This multiplexing control information includes information (encoding order information) indicating how many frames that were input to the encoding control section 104 had preceded before the frame to be output next and information (encoding assignment information) indicating which of the entropy encoding sections will process the frame to be output next. A method of determining the entropy encoding section for the next frame and a concrete example of the multiplexing control information will be described later.

The first entropy encoding section 105 and the second entropy encoding section 106 both have an identical configuration and correspond to the context calculating section 202 and the binary arithmetic encoding section 203 in FIG. 2. In this configuration, the first entropy encoding section 105 and the second entropy encoding section 106 entropy-encode the intermediate data (binarized data) output from the encoding control section 104 (binary arithmetic encoding) on the basis of a probability model to generate a first bit stream and a second bit stream, respectively. The two sections then output the first bit stream and the second bit stream to the multiplexing section 107. In the present embodiment, the entropy encoding sections 105 and 106 both have a maximum encoding process capability of 50 Mbps and achieve a target bit rate of 80 Mbps by causing the two entropy encoding sections 105 and 106 to perform parallel processing.

The multiplexing section 107 multiplexes the first and second bit streams encoded by the first and second entropy encoding sections 105 and 106 into one bit stream. To begin the multiplexing process, the multiplexing section 107 writes the first and second bit streams output from the entropy encoding sections 105 and 106 to a first bit stream buffer 304 and a second bit stream buffer 305 of the memory 108 via the bus 109. The multiplexing section 107 also reads the first and second bit streams from the buffers 304 and 305 to be multiplexed. At this time, the multiplexing section 107 writes the bit streams to the buffers 304 and 305 in accordance with the multiplexing control information received from the encoding control section 104 while distinguishing the bit streams in frame units and reads the bit streams in frame units in order.

Figure 4:
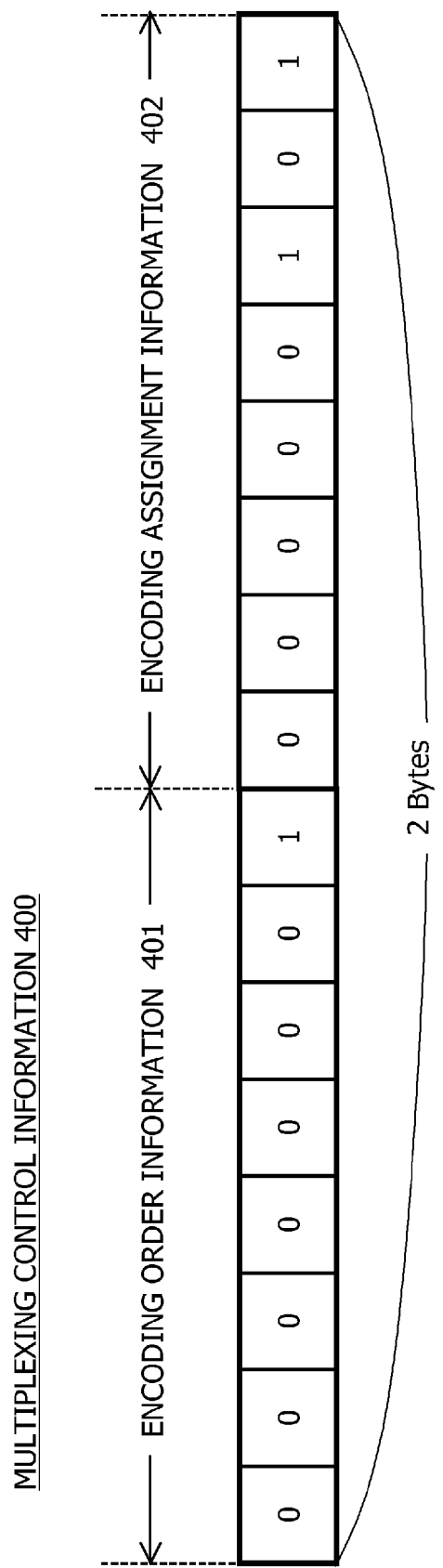
FIG. 4 is a diagram showing an example of multiplexing control information 400.

FIG. 4 is a diagram showing an example of the multiplexing control information 400 sent from the encoding control section 104 to the multiplexing section 107. The multiplexing control information 400 includes encoding order information 401 and encoding assignment information 402, which are each described in one byte (total of two bytes). The encoding order information 401 is a value incremented each time aforementioned intermediate data for one frame is input to the encoding control section 104. The encoding assignment information 402 is given "0" when the first entropy encoding section 105 is used, and is given "1" when the second entropy encoding section 106 is used. By referring to the multiplexing control information 400, the multiplexing section 107 can read the first and second bit streams, which are written in the buffers 304 and 305 separately from each other, in order of frames and then convert the first and second bit streams into a bit stream in the original order.

A concrete example of encoding process in the present embodiment will next be described.

Figure 5:
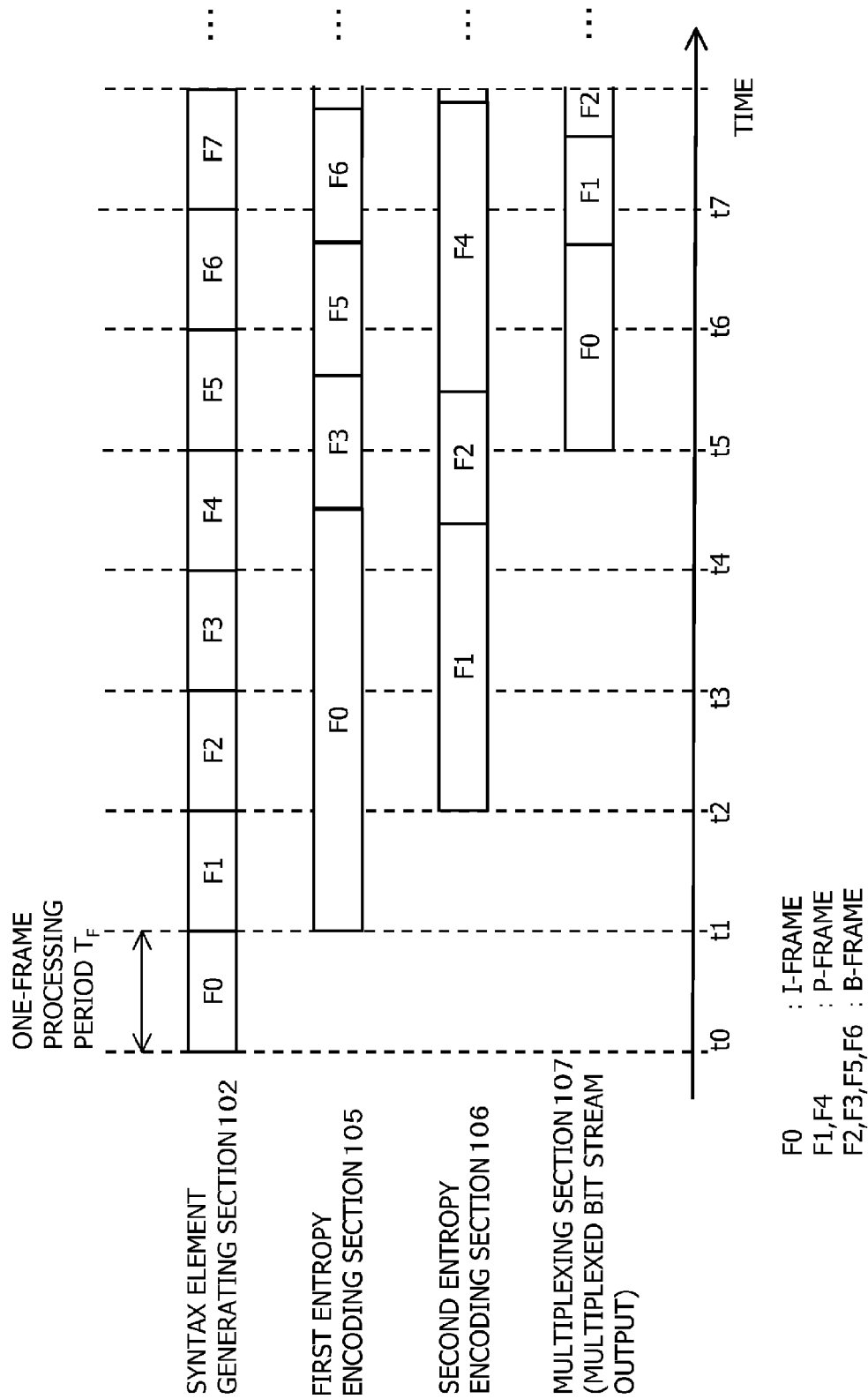
FIG. 5 is a diagram showing the timing of encoding process operation according to the first embodiment.

FIG. 5 is a diagram showing the timing of encoding process operation according to the first embodiment. This figure shows the timing of processing of the syntax element generating section 102, the first and second entropy encoding sections 105 and 106, and the multiplexing section 107. An axis of abscissas is a time axis, showing a one-frame processing period $T_F$ as a unit. The one-frame processing period $T_F$ is a time assignable to the processing of one frame when an encoding object image is encoded in real time. On occasions when an image has a frame rate of 30 fps, for example, the one-frame processing period $T_F$ will be approximately 0.033 sec. F0, F1, . . . denote frame numbers. The picture configuration thereof would be encoded with F0 representing an I-frame, F1 and F4 representing a P-frame, and F2, F3, F5, and F6 representing a B-frame.

The syntax element generating section 102 sequentially generates the syntax elements of each frame within a one-frame processing period $T_F$. A processing time in the syntax element generating section 102 depends on the number of pixels of the encoding object image while the processing time of each frame is constant. An amount of code per frame is rate-controlled to have 5.7 Mbits for an I-frame, 3.8 Mbits for a P-frame, and 1.9 Mbits for a B-frame. The syntax elements of each frame are output to the intermediate data generating section 103 to be converted into intermediate data.

The first entropy encoding section 105 and the second entropy encoding section 106 entropy-encodes (hereinafter referred to simply as encoding) the intermediate data of each frame to convert the intermediate data of each frame into bit streams. At this time, the encoding control section 104 assigns the encoding of a next frame to the entropy encoding section that has completed the encoding process earlier.

Encoding process time in the first and second entropy encoding sections 105 and 106 depends on a magnitude of an amount of code of each frame. The entropy encoding sections 105 and 106 both have a maximum processing capability of 50 Mbps and are thus able to process a maximum of approximately 1.7 Mbits in a one-frame processing period $T_F$. Hence, the necessary time to encode each frame is approximately 3.4 $T_F$ for an I-frame (5.7 Mbits), approximately 2.3 $T_F$ for a P-frame (3.8 Mbits), and approximately 1.1 $T_F$ for a B-frame (1.9 Mbits).

In the encoding process, the assigned entropy encoding section encodes all of the intermediate data of the assigned frame. The intermediate data of the frame concerned, on the contrary, is not encoded in the other entropy encoding sections at all. In addition, the intermediate data of another frame will not be encoded until the entropy encoding section has completed the encoding process of the intermediate data of an assigned frame in each of the entropy encoding sections. In other words, the intermediate data of one frame will not be encoded by two entropy encoding sections, and the encoding of the intermediate data of one frame will not suspend in the middle of the process to switch to another frame.

Therefore, the intermediate data of each of the frames F0, F1, . . . is subjected to the encoding process in the entropy encoding sections 105 and 106 as follows.

The frame F0 is supplied to the first entropy encoding section 105 in the timing of time t1, and is subjected to the encoding process at time t1. The frame F0 is an I-frame and thus takes an encoding process time of approximately 3.4 $T_F$. A bit stream after the encoding of the frame F0 is written to the first bit stream buffer 304 of the memory 108.

The frame F1 is supplied to the second entropy encoding section 106, which is not in the middle of encoding process at the timing of time t2, and is subjected to encoding process at time t2. The frame F1 is a P-frame and thus takes an encoding process time of approximately 2.3 $T_F$. A bit stream after the encoding of the frame F1 is written to the second bit stream buffer 305 of the memory 108.

The frame F2 is supplied in the timing of time t3, during which the two entropy encoding sections 105 and 106 are both in the encoding process, and thus waits until the process of any of the two entropy encoding sections 105 and 106 has been completed. In the present example, the second entropy encoding section 106 processing the frame F1 terminates the process first after time t4. Thus, the frame F2 is supplied to the second entropy encoding section 106. As a result, the second entropy encoding section 106 next processes the frame F2 following the frame F1. The frame F0 is a B-frame, and hence takes an encoding process time of approximately 1.1 $T_F$. A bit stream after the encoding of the frame F2 is written to the second bit stream buffer 305 of the memory 108.

The frame F3 is supplied in the timing of time t4; however, the preceding frame F2 is in a process waiting state. The frame F3 therefore waits until the process of the frame F2 starts. After the process of the frame F2 starts, the frame F3 is supplied to the first entropy encoding section 105, which completes the process first. As the result, the first entropy encoding section 105 will processes the frame F3 following the frame F0.

A similar processing applies to the subsequent frames F4, F5, . . . . Each frame is encoded continuously by a supply of each frame to the entropy encoding section that has completed the encoding process earlier.

The multiplexing section 107 starts the multiplexing process in the timing of time t5 after the bit stream of the first frame F0 has been generated. The multiplexing section 107 reads the bit streams from the buffer 304 and the buffer 305 of the memory 108 in order of the frames on the basis of the multiplexing control information 400 of FIG. 4, converts the bit streams into a multiplexed bit stream, and outputs the multiplexed bit stream.

Figure 6:
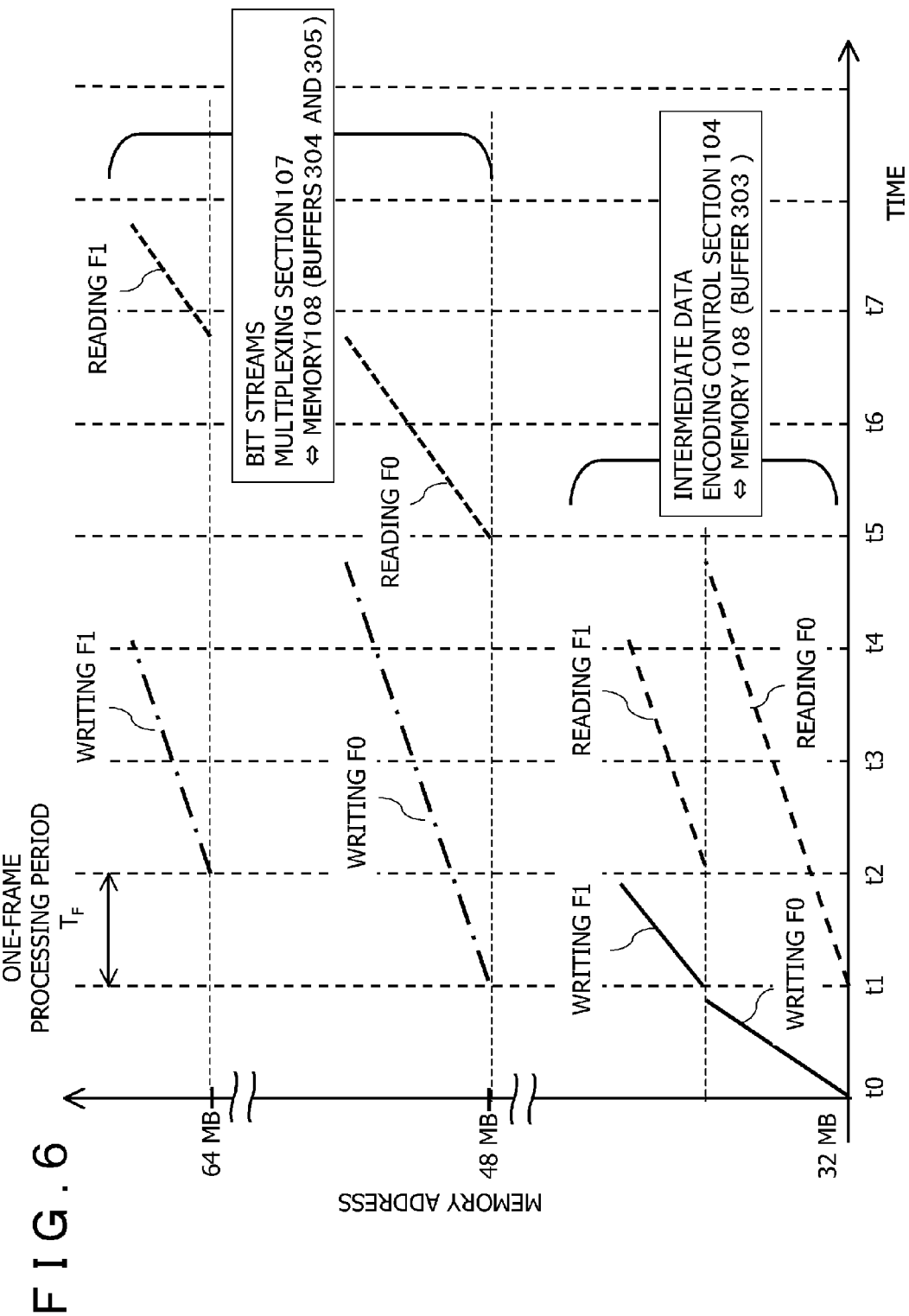
FIG. 6 is a diagram showing the timing of reading and writing data from and to the memory 108.

FIG. 6 is a diagram showing the timing of reading and writing data from and to the memory 108. An axis of ordinates indicates a memory address, and an axis of abscissas is a time axis. This figure shows the reading and writing of the intermediate data and the bit streams of the frames F0 and F1. Out of the memory addresses, a lower-tier region (32 to 48 MB) is the intermediate data buffer 303; a middle-tier region (48 to 64 MB) is the first bit stream buffer 304; and an upper-tier region (64 MB and over) is the second bit stream buffer 305.

Description will first be made of the writing of the intermediate data. The encoding control section 104 writes the intermediate data of the frames F0 and F1 output from the intermediate data generating section 103 to consecutive addresses of the buffer 303 (indicated by solid lines). The writing timing of the frame F0 starts at time t0, and that of the frame F1 starts at time t1. A one-frame processing period $T_F$ is spent for the respective frames. As an amount of intermediate data differs between the frames F0 and F1, a writing speed (slope in the graph) differs between the frames F0 and F1. At this time, the encoding control section 104 stores encoding order information and an end address each time the writing of one frame is completed.

The encoding control section 104 reads the intermediate data of the frames F0 and F1 from the buffer 303 (indicated by broken lines). At times of the reading, the encoding control section 104 reads the intermediate data in order of the encoding process and by one frame on the basis of the encoding order information and the end address of each frame, which are stored at the time of the aforementioned writing. The read intermediate data of the frame F0 is output to the first entropy encoding section 105. The read intermediate data of the frame F1 is output to the second entropy encoding section 106. The present embodiment assumes a case where the entropy encoding sections 105 and 106 have a low buffer capacity for the intermediate data. In order to coincide with the start of encoding in the entropy encoding sections 105 and 106, the reading timing of the frame F0 and F2 start at time t1 and time t2, respectively. In addition, reading speed (slope in the graph) is constant so as to coincide with the process speed of the entropy encoding sections 105 and 106. Therefore, the reading time of the frames F0 and F1 differs depending on the amount of intermediate data of the frames F0 and F1. If the entropy encoding sections 105 and 106 have a sufficient buffer capacity, the encoding process may be performed after intermediate data for one frame has been read continuously and stored in a buffer.

Description will next be made of the writing of the bit streams. The multiplexing section 107 writes the bit stream of the frame F0 output from the first entropy encoding section 105 to the buffer 304, and writes the bit stream of the frame F1 output from the second entropy encoding section 106 to the buffer 305 (indicated by alternate long and short dashed lines). The writing timing of the frame F0 and F1 start at time t1 and t2, respectively, in order to be synchronized with the encoding process in the respective entropy encoding sections 105 and 106. The multiplexing section 107 stores the information indicating how many frames to be output have preceded before the frame on which the bit streams will be written on the basis of the multiplexing control information (encoding order information) received from the encoding control section 104. The multiplexing section 107 further stores information indicating where the bit streams have been written in the buffers 304 and 305 (start address information) and the size information of the respective frames.

The multiplexing section 107 reads the bit stream of the frame F0 from the buffer 304, and next reads the bit stream of the frame F1 from the buffer 305 (indicated by dotted lines). Reading timing is in accordance with the multiplexing control information (encoding order information) received from the encoding control section 104. After the reference to the start address information of each frame storing start address information at the time of the writing, the size of the frames concerned is read. In FIG. 6, the reading of the frame F0 starts at time t5, and the reading of the frame F1 starts when the reading of the frame F0 has been terminated. It is thereby possible to multiplex the bit streams in order in which the intermediate data is input to the encoding control section 104 and output a bit stream compliant with the standard.

Description will next be made of a method of determining, in the encoding control section 104, which of the first entropy encoding section 105 and the second entropy encoding section 106 to use to encode the intermediate data of each frame.

Figure 7:
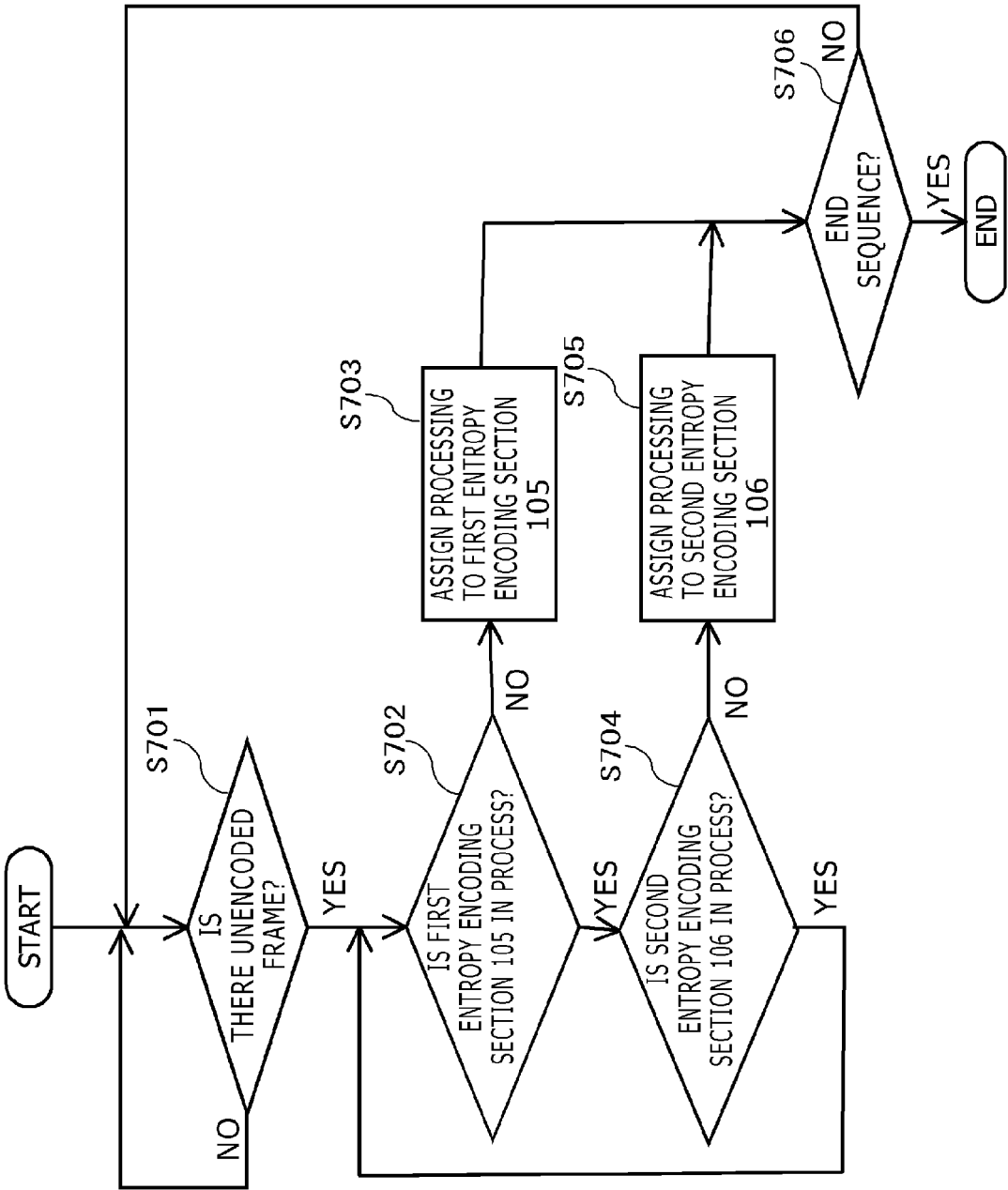
FIG. 7 is a flowchart of a determining method for intermediate data encoding assignment.

FIG. 7 is a flowchart of the determination method of intermediate data encoding assignment.

In S701, a determination is made as to whether there is intermediate data (unencoded frame data) of a frame whose entropy encoding process has not yet started in the entropy encoding section 105 or 106, in the intermediate data stored in the intermediate data buffer 303 of the memory 108. In this determination, intermediate data will not be recognized as unencoded frame data until process for one frame in the syntax element generating section 102 has been completed. That is, even when there is data of a frame being processed in the syntax element generating section 102, the data will not be recognized as unencoded frame data.

When it is determined in the determination of S701 that there is no unencoded frame data (No), loop processing is repeated until it has been determined that there is unencoded frame data. When it has been determined that there is unencoded frame data (Yes), on the other hand, the process proceeds to S702.

In S702, a determination is made as to whether the first entropy encoding section 105 is encoding other frame data. When the first entropy encoding section 105 is in process (Yes), the process proceeds to S704. When the first entropy encoding section 105 is not in process (No), the process proceeds to S703.

In S703, it is determined that the unencoded frame data is to be encoded in the first entropy encoding section 105. After the multiplexing control information of the corresponding frame has been notified to the multiplexing section 107, the unencoded frame data will be read from the memory 108 and will be output to the first entropy encoding section 105.

In S704, a determination is made as to whether the second entropy encoding section 106 is encoding other frame data. When the second entropy encoding section 106 is in process (Yes), the process returns to S702 to perform loop processing until it has been determined in either S702 or S704 that the second entropy encoding section 106 is not in process (No). When it has been determined in S704 that the second entropy encoding section 106 is not in process (No), the process proceeds to S705.

In S705, it is determined that the unencoded frame data is to be encoded in the second entropy encoding section 106. After the multiplexing control information of the corresponding frame has been notified to the multiplexing section 107, the unencoded frame data will be read from the memory 108 and output to the second entropy encoding section 106.

In S706, a determination is made as to whether to end the encoding assignment sequence. If the encoding assignment sequence is not to be terminated, the process returns to S701 to repeat the above-described processes.

According to the above-described flowchart, when there is unencoded frame data, the next frame can be encoded continuously by using the entropy encoding section that has completed the encoding process earlier. This can minimize the suspension period of the first and second entropy encoding sections 105 and 106 and maximize a processing performance.

This will be compared with the conventional method. Consideration will be given to a case where one frame is divided into N regions, and encoding devices are assigned to the respective regions in advance as in the above-described Japanese Patent Laid-Open No. H09-238334. In this case, when a degree of difficulty in encoding differs in each region, an amount of code generated in each encoding device varies. Hence, in order to ensure the real-time processing, the processing capability of each encoding device needs to be set at a value higher than 1/N of a target bit rate. The method according to the present embodiment contrarily assigns the entropy encoding section for encoding a next frame in accordance with the processing status of the respective entropy encoding sections. Hence, even when an amount of code differs for each frame, each entropy encoding section operates at substantially a rate of operation of 100%. A minimum bit rate value therefore suffices the processing capability given to the entropy encoding sections.

Modifications of the first embodiment can be made as follows.

In the above-described example, the two entropy encoding sections 105 and 106 are provided. However, three or more entropy encoding sections operate similarly, which can further reduce a processing load on one entropy encoding section. Also in this case, the encoding control section 104 determines an entropy encoding section that next performs the encoding process by a frame in accordance with the processing status of the respective entropy encoding sections.

The CABAC of H.264 is adopted as an encoding system. However, the encoding system is not limited to this. A context adaptive entropy encoding system (CAVLC), which changes a probability table at every encoding, can also be adopted.

An SDRAM is used as the memory 108 for storing data during encoding process. However, a configuration may be adopted in which a part of the buffers is an SRAM, and data is buffered in the SRAM without passing through the bus 109.

All of I-frames, P-frames, and B-frames are used for a picture configuration. However, other picture configurations may be used, such as a picture configuration of only I-frames and a picture configuration of only I-frames and P-frames.

The intermediate data is recorded with no change in the intermediate data buffer 303 of the memory 108. However, a compressing and decompressing section may be provided between each processing section and the bus 109 so that compressed data obtained by compression processing is recorded in the memory 108 and the compressed data read from the memory 108 is subjected to a decompression processing. In that case, the storage capacity of the memory 108 and the bandwidth of the bus 109 can be reduced.

According to the first embodiment, a plurality of entropy encoding sections sharing a target encoding process capability (bit rate) is provided. The encoding control section determines the entropy encoding section that performs a next encoding process for each frame in accordance with the processing status of the respective entropy encoding sections. At this time, the determined entropy encoding section entropy-encodes all the intermediate data of a corresponding frame, and the other entropy encoding sections do not entropy-encode the intermediate data of the frame concerned at all. This eliminates a need to divide one picture (one frame) into a plurality of regions. Thus, the degradation in image quality will not occur at boundary parts within a picture in principle, whereby the encoding process at a high bit rate will be achieved.

In particular, the encoding control section causes an entropy encoding section that has completed the encoding process early among a plurality of entropy encoding sections to perform next encoding process. This minimizes the processing suspension period of the respective entropy encoding sections. Thus, efficient encoding process can be achieved by making maximum use of the processing performance of each of the entropy encoding sections.

Second Embodiment

In the first embodiment, the first and second entropy encoding sections 105 and 106 start entropy-encoding one frame after the syntax element generating section 102 (and the intermediate data generating section 103) has completed the generation of data for the frame. That is, in the determination of S701 in FIG. 7, the encoding control section 104 recognizes that there is unencoded frame data at a point in time when the syntax element generating section 102 completes processing one frame.

In a second embodiment, the first or second entropy encoding section 105 or 106, on the contrary, starts entropy-encoding one frame at a point in time when the syntax element generating section 102 (and the intermediate data generating section 103) has generated minimum data necessary for encoding within the frame. Specifically, the first or second entropy encoding section 105 or 106 starts encoding a frame at a point in time when processing of a first MB (macroblock) of the frame has been completed. Also in the determination of S701 in FIG. 7, the encoding control section 104 recognizes that there is unencoded frame data at the point in time when the first MB of the frame has been generated. This can shorten a delay time from the input of encoding object image data to the output of a multiplexed bit stream.

Figure 8:
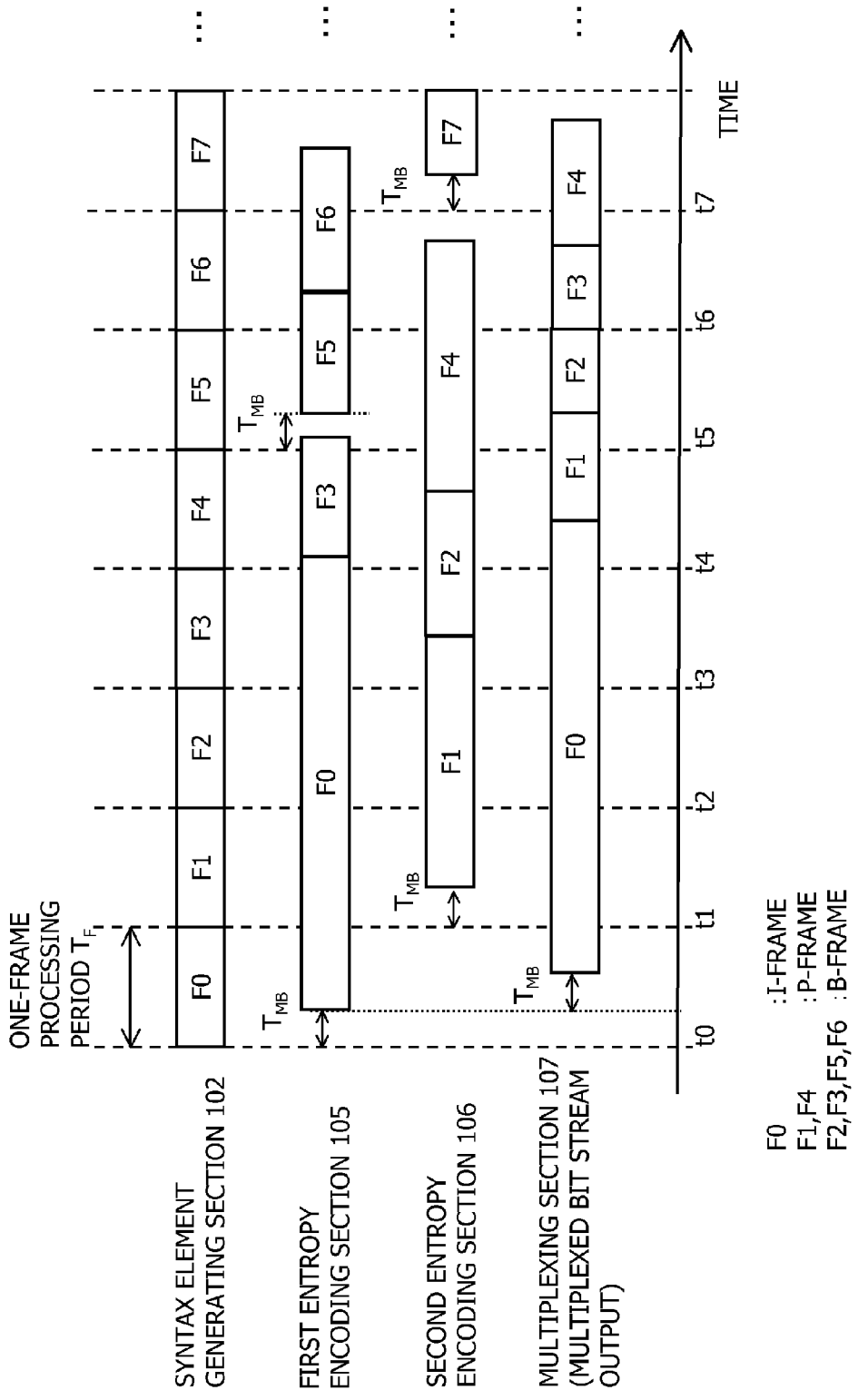
FIG. 8 is a diagram showing the timing of encoding process operation in a second embodiment.

FIG. 8 is a diagram showing the timing of encoding process operation in the second embodiment. A processing time for one MB in the syntax element generating section 102 is denoted as $T_{MB}$.

When the syntax element generating section 102 has completed processing a first MB after the start of processing a frame F0; that is, after the passage of $T_{MB}$ from time t0, the encoding control section 104 determines that the unencoded frame F0 has been stored in the buffer 303 and will start outputting the intermediate data of the frame F0 to the first entropy encoding section 105. Receiving the intermediate data of the frame F0, the first entropy encoding section 105 starts encoding the frame F0.

Similarly, when the syntax element generating section 102 has completed processing a first MB of a frame F1; that is, after the passage of $T_{MB}$ from time t1, the encoding control section 104 will start outputting the intermediate data of the frame F1 to the second entropy encoding section 106. Receiving the intermediate data of the frame F1, the second entropy encoding section 106 starts encoding the frame F1.

The encoding of frames F5 and F7 starts after the passage of $T_{MB}$ from time t5 and t7, respectively. However, the encoding of other frames F2, F3, F4, and F6 starts in the first or second entropy encoding section 105 or 106 after waiting for the encoding process of the preceding frames to be completed.

The multiplexing section 107 starts outputting a multiplexed bit stream from the frame F0 in order after the passage of $T_{MB}$ from the start of the encoding process of the frame F0 by the first entropy encoding section 105. However, the output of the multiplexed bit stream of each frame is completed after the termination of the encoding process of each frame.

According to the second embodiment, as compared with the foregoing first embodiment (FIG. 5), the processing timing of each processing section is advanced, whereby a delay time of output timing of the multiplexed bit stream with respect to input timing of the encoding object image data will be shortened.

Third Embodiment

In the foregoing first and second embodiments, the encoding control section 104 is configured to write intermediate data after binarization processing by the intermediate data generating section 103 to the memory 108, read the intermediate data, and output the intermediate data to the first and second entropy encoding sections 105 and 106. In a third embodiment, on the other hand, syntax elements before binarization processing are written to the memory 108, and the syntax elements are read and subjected to encoding process.

Figure 9:
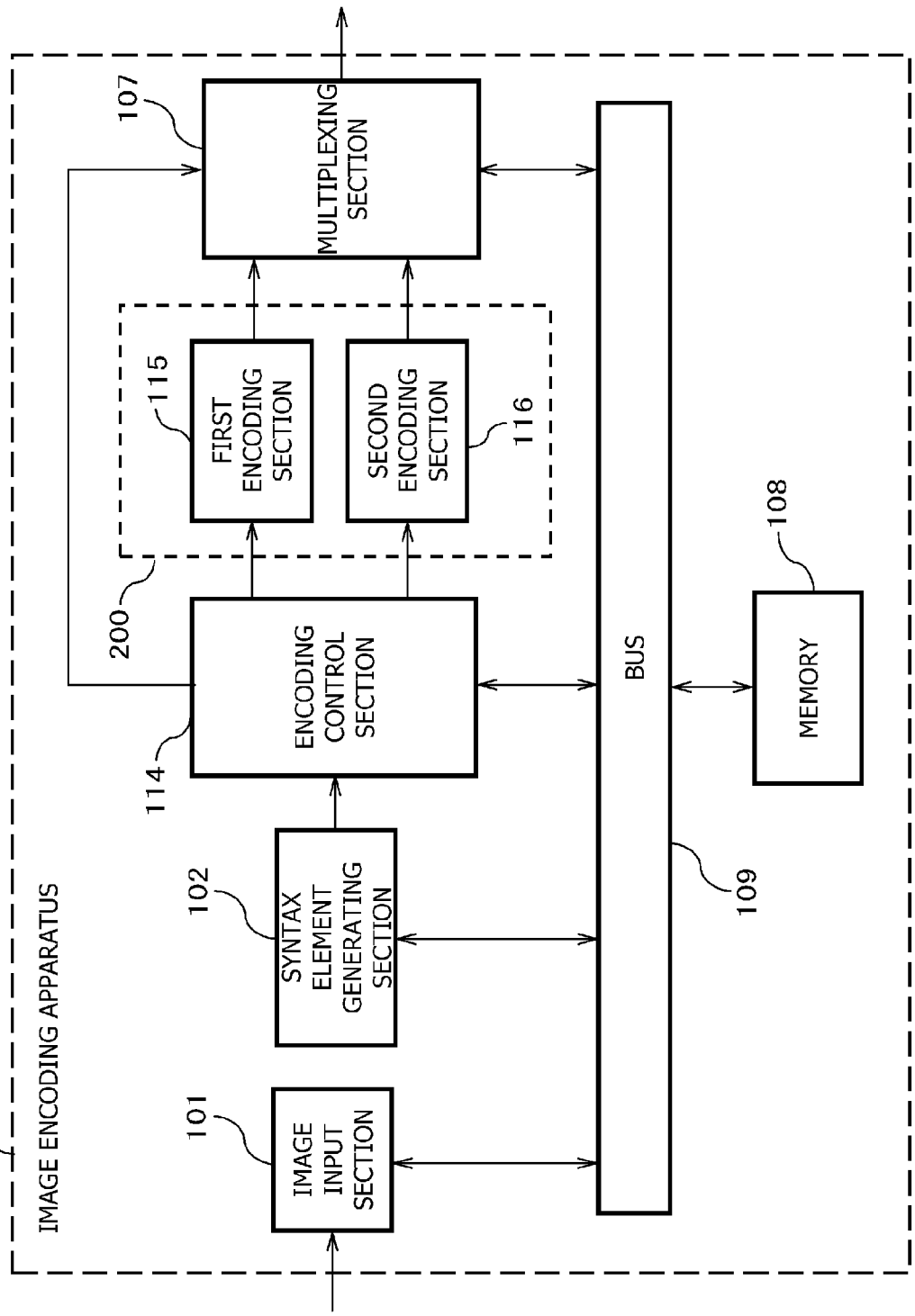
FIG. 9 is a diagram showing a configuration of an image encoding apparatus according to a third embodiment.

FIG. 9 is a diagram showing a configuration of an image encoding apparatus according to a third embodiment. In the image encoding apparatus 2, the intermediate data generating section 103 in the first embodiment (FIG. 1) is omitted, and an encoding control section 114, a first encoding section 115, and a second encoding section 116 are provided. Other processing sections are the same as in FIG. 1 and are identified by the same reference numerals. A broken line 200 represents a constituent part where the CABAC processing is performed. In the third embodiment, the first encoding section 115 and the second encoding section 116 correspond to the constituent part. The inside of the first encoding section 115 and the second encoding section 116 has the configuration of FIG. 2.

In this case, syntax elements generated in a syntax element generating section 102 are input to the encoding control section 114. The encoding control section 114 operates in a similar manner to the encoding control section 104 in FIG. 1. However, data read and written from and to the buffer 303 of a memory 108 is not intermediate data but the syntax elements. The encoding control section 114 determines the encoding section that encodes next syntax elements for each frame and outputs the syntax elements to the determined encoding section. The first and second encoding sections 115 and 116 subject the syntax elements supplied from the encoding control section 114 to the encoding process (CABAC processing) and then output a first bit stream and a second bit stream. The operation of the other processing sections is similar to that in the first embodiment, and therefore, description thereof will be omitted.

Also in the third embodiment, the two encoding sections 115 and 116 are provided, and the encoding control section 114 determines the encoding section that performs a next encoding process for each frame in accordance with the processing status of each of the encoding sections 115 and 116. Thus, degradation in image quality does not occur at boundary parts within a picture in principle, whereby efficient encoding process at a high bit rate will be achieved.

It is to be noted that in the configuration according to the third embodiment, the encoding system of the first and second encoding sections 115 and 116 is not limited to CABAC processing, but another system such as CAVLC is also applicable. In addition, it is needless to say that various kinds of modifications described in the first embodiment are possible.

What is claimed is:

1. An image encoding apparatus for encoding image data, the image encoding apparatus comprising:
    a syntax element generating section for generating syntax elements from the image data;
    an intermediate data generating section for generating intermediate data from the syntax elements;
    a plurality of entropy encoding sections for generating bit streams by entropy-encoding the intermediate data;
    a multiplexing section for multiplexing a plurality of the encoded bit streams into one bit stream; and
    an encoding control section for writing the intermediate data output from the intermediate data generating section to a memory, reading the intermediate data from the memory, and supplying the intermediate data to any of the entropy encoding sections, wherein
    the encoding control section determines an entropy encoding section that performs an entropy encoding process by a frame in accordance with processing status of each of the entropy encoding sections, reads the intermediate data of a corresponding frame from the memory, and supplies the intermediate data of the corresponding frame to the determined entropy encoding section, and
    the determined entropy encoding section entropy-encodes all the intermediate data of the corresponding frame, and other entropy encoding section does not entropy-encode the intermediate data of the frame concerned.

2. The image encoding apparatus according to claim 1, wherein the determined entropy encoding section does not entropy-encode the intermediate data of another frame until the determined entropy encoding section has completed entropy-encoding the intermediate data of the corresponding frame.

3. The image encoding apparatus according to claim 1, wherein the encoding control section assigns an entropy encoding of a next frame to an entropy encoding section that has completed entropy-encoding a preceding frame earliest of the entropy encoding sections.

4. The image encoding apparatus according to claim 1, wherein at a point in time when the intermediate data generating section has generated intermediate data for a first macroblock within one frame, the encoding control section supplies the intermediate data to the entropy encoding section to start an entropy encoding process.

5. The image encoding apparatus according to claim 1, wherein the multiplexing section writes and reads the bit streams to and from the memory while distinguishing the bit streams by a frame, and sets an order of read to an order of frames at a time that the intermediate data or the syntax elements are input to the encoding control section.

6. An image encoding apparatus for encoding image data, the image encoding apparatus comprising:
    a syntax element generating section for generating syntax elements from the image data;
    a plurality of encoding sections for generating bit streams by encoding the syntax elements;
    a multiplexing section for multiplexing a plurality of the encoded bit streams into one bit stream; and an encoding control section for writing the syntax elements output from the syntax element generating section to a memory, reading the syntax elements from the memory, and supplying the syntax elements to any of the encoding sections, wherein the encoding control section determines an encoding section that performs an encoding process by a frame in accordance with processing status of each of the encoding sections, reads the syntax elements of a corresponding frame from the memory, and supplies the syntax elements of the corresponding frame to the determined encoding section, and the determined encoding section encodes all the syntax elements of the corresponding frame, and the other encoding section does not encode the syntax elements of the frame concerned.

7. The image encoding apparatus according to claim 6, wherein the multiplexing section writes and reads the bit streams to and from the memory while distinguishing the bit streams by a frame, and sets an order of read to an order of frames at a time that the intermediate data or the syntax elements are input to the encoding control section.

\* \* \* \* \*